(12) United States Patent
Chiu et al.

(10) Patent No.: US 11,501,141 B2
(45) Date of Patent: Nov. 15, 2022

(54) SHIFTING ARCHITECTURE FOR DATA REUSE IN A NEURAL NETWORK

(71) Applicant: Western Digital Technologies, Inc., San Jose, CA (US)

(72) Inventors: Pi-Feng Chiu, Milpitas, CA (US); Won Ho Choi, San Jose, CA (US); Wen Ma, Milpitas, CA (US); Martin Lueker-Boden, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 910 days.

(21) Appl. No.: 16/354,907

(22) Filed: Mar. 15, 2019

(65) Prior Publication Data

US 2020/0117982 A1   Apr. 16, 2020

Related U.S. Application Data

(60) Provisional application No. 62/744,929, filed on Oct. 12, 2018.

(51) Int. Cl.
*G06N 3/063*   (2006.01)
*G06N 3/08*   (2006.01)
*G06F 5/08*   (2006.01)
*G06F 13/38*   (2006.01)

(52) U.S. Cl.
CPC .............. *G06N 3/063* (2013.01); *G06F 5/08* (2013.01); *G06F 13/38* (2013.01); *G06N 3/08* (2013.01)

(58) Field of Classification Search
CPC ........ G06F 17/16; G06F 17/15; G06F 17/153; G06N 3/063
See application file for complete search history.

(56) References Cited

U.S. PATENT DOCUMENTS

| | | | |
|---|---|---|---|
| 2018/0005074 A1* | 1/2018 | Shacham | G06V 10/36 |
| 2018/0314671 A1* | 11/2018 | Zhang | G06N 3/063 |
| 2021/0342678 A1* | 11/2021 | Mostafa | G06N 3/084 |

FOREIGN PATENT DOCUMENTS

EP    3035249 A1    6/2016

OTHER PUBLICATIONS

Prezioso et al. "Training and Operation of an Integrated Neuromorphic Network Based on Metal-Oxide Memristors". paes 1-21. (Year: 2014).*

(Continued)

*Primary Examiner* — Chuong D Ngo
(74) *Attorney, Agent, or Firm* — Vierra Magen Marcus LLP

(57) ABSTRACT

Enhanced techniques and circuitry are presented herein for artificial neural networks. These artificial neural networks are formed from artificial synapses, which in the implementations herein comprise a memory arrays having non-volatile memory elements. In one implementation, an apparatus comprises a plurality of non-volatile memory arrays configured to store weight values for an artificial neural network. Each of the plurality of non-volatile memory arrays can be configured to receive data from a unified buffer shared among the plurality of non-volatile memory arrays, operate on the data, and shift at least portions of the data to another of the plurality of non-volatile memory arrays.

20 Claims, 8 Drawing Sheets

(56) References Cited

OTHER PUBLICATIONS

Emer, Joel et al, "Hardware Architectures for Deep Neural Networks" Micro Tutorial (2016) in association with Massachusetts Institute of Technology and NVIDIA, Oct. 16, 2016, 300 pages, located at http://www.rle.mit.edu/eems/wp-content/uploads/2016/11/Tutorial-on-DNN-All-Parts.pdf.

* cited by examiner

SHIFTING ARCHITECTURE FOR DATA REUSE IN A NEURAL NETWORK

RELATED APPLICATIONS

This application hereby claims the benefit of and priority to U.S. Provisional Patent Application 62/744,929, titled "SHIFTING ARCHITECTURE FOR DATA REUSE IN A NEURAL NETWORK," filed Oct. 12, 2018, which is hereby incorporated by reference in its entirety.

TECHNICAL FIELD

Aspects of the disclosure are related to the field of hardware implementations of artificial neural networks.

BACKGROUND

Artificial neural networks (ANNs) can be formed from individual artificial neurons or synapses that are emulated using software, integrated hardware, or other discrete elements. Such neural networks may be used to perform a variety of functions, such as image processing. In image processing applications, specialized neural networks (commonly referred to as convolutional neural networks or CNNs) may be used to analyze an image to detect certain features that may be included within the image. To perform image processing, a neural network may operate on portions of the image as defined by one or more filters or kernels which convolve around the image. As part of the processing, the neural network may perform multiply-and-accumulate (MAC) operations on the data in an area of the image specified by the filter when the filter is located at a particular position with the image.

To implement a neural network using computer-based hardware, a processor and memory circuits may be employed. During operation, data can be transferred from the memory circuits to the processor in order to perform MAC operations. Such data transfers may result in data transfer bottlenecks between the processor and the memory circuits, as well as consume power as signals that carry the data are transferred between the processor and the memory circuits.

Overview

Enhanced techniques and circuitry are presented herein for artificial neural networks. These artificial neural networks are formed from artificial synapses, which in the implementations herein comprise a memory arrays having non-volatile memory elements. In one implementation, an apparatus comprises a plurality of non-volatile memory arrays configured to store weight values for an artificial neural network. Each of the plurality of non-volatile memory arrays can be configured to receive data from a unified buffer shared among the plurality of non-volatile memory arrays, operate on the data, and shift at least portions of the data to another of the plurality of non-volatile memory arrays.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
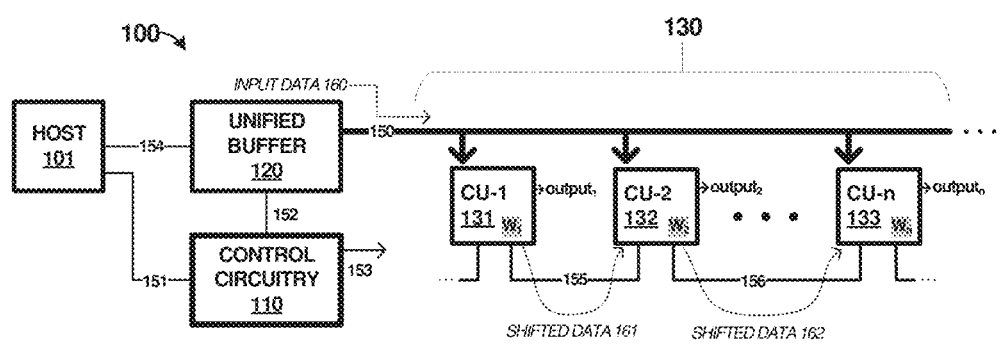
FIG. 1 illustrates an artificial neural network system in an implementation.

Artificial neural networks (ANN) have been developed to process sets of complex data using techniques deemed similar to biological neurons. Biological neurons characteristically produce an output in response to various synaptic inputs to the neuron cell body, and some forms of artificial neurons attempt to emulate this behavior. Complex networks of artificial neurons can thus be formed, using artificial neural connections among artificial neurons as well as properties of these artificial neurons to process large sets of data or perform tasks too complex for conventional data processors, such as machine learning.

ANNs can be formed from individual artificial neurons that are emulated using software, or from integrated hardware and discrete circuit elements. As discussed herein, artificial neurons can comprise individual memory elements, such as non-volatile memory elements, or might be represented using other types of memory elements or software elements. Artificial neurons are interconnected using artificial neural connections, which are referred to herein as neural connections for clarity. These neural connections are designed to emulate biological neural synapses and axons which interconnect biological neurons. These neural connections can comprise electrical interconnects, such as wires, traces, circuitry, and various discrete or integrated logic or optical interconnects. When memory elements are employed to form artificial neurons, then these neural connections can be formed in part by control lines of any associated memory array. These control lines can include input control lines that introduce data to artificial neurons, and output control lines which receive data from artificial neurons. In specific implementations, the control lines may comprise word lines and bit lines of a memory array.

ANNs can execute various machine learning tasks, image processing tasks, and other data processing tasks within an ANN framework. Various types of ANNs have been developed, which typically relate to topologies for connecting artificial neurons as well as how data is processed or propagated through an ANN. For example, feedforward ANNs propagate data through sequential layers of artificial neurons in a 'forward' manner, which excludes reverse propagation and loops. Fully-connected ANNs have layers of artificial neurons, and each artificial neuron is each connected to all artificial neurons of a subsequent layer. Convolutional neural networks (CNNs) are formed by multiple layers of artificial neurons which are fully connected and propagate data in a feed-forward manner.

The process of propagating and processing data through an ANN to produce a result is typically referred to as inference. However, many ANNs must first be trained before data sets can be processed through the ANN. This training process can establish connectivity among individual artificial neurons as well as data processing properties of each artificial neuron. The data processing properties of artificial neurons can be referred to as weights or synaptic weights. Synaptic weights indicate a strength or amplitude of a connection among two artificial neurons. This can correspond to an amount of influence that firing a first artificial neuron has on another artificial neuron.

Many ANN implementations use semiconductor-based computing devices to emulate the behavior of biological neurons. In computer-based ANN hardware, a processor, such as a central processing unit (CPU) or graphics processing unit (GPU), and associated memory circuits may be employed. More recently, emerging non-volatile memory (NVM) devices, including phase change memory (PCM), resistive random-access memory (RRAM or RDRAM), and magnetic random-access memory (MRAM) formed from magnetic tunnel junctions (MTJs), have been proposed to be used to emulate synaptic weights as well as emulate biological neurons. These devices fall into the broad category of memristor memory technology and can offer very high density and connectivity due to a correspondingly small footprint. High density memristor memory technologies have become possible using new materials which have alterable resistance states, conductance states, material states, or magnetization states that persist after application of an electric voltage or current. Memristors and other related resistive memory devices typically comprise electrical components which relate electric charge to magnetic flux linkage, where an electrical resistance of a memristor depends upon a previous electrical current or voltage passed by the memristor.

Non-volatile memory (NVM) elements representing synaptic weights of artificial neural networks will be considered below, although the enhanced circuitry and techniques can be applied across other circuit types and. ANN topologies. Individual NVM elements can be formed into large arrays interconnected via control lines coupled to the NVM elements to implement various types of ANNs. In some examples, these control lines can include bit line and word line arrangements, but the control lines, in other embodiments, can include other elements and interfaces with other memory array arrangements. Specifically, resistive memory elements are organized into addressable arrays of artificial synapses used to form an ANN. Control line connections can be used to not only write and read the NVM elements in an array, but also to logically subdivide the NVM array into logical units of an ANN. These logical units may each comprise an arbitrary quantity of NVM elements, such as 64×64, which may be selected based on integration limitations, such as parasitic capacitances, or may instead be mapped to individual layers in an ANN. Each NVM element, or differential grouping of NVM elements discussed below, is referred to as a node of the ANN Typically, the quantity of NVM elements or nodes is the same in each logical unit, but other embodiments may use different numbers of NVM elements in each logical unit. In some examples, nodes of each logical unit can comprise entire memory pages of an NVM array, or might span multiple memory pages. Furthermore, nodes of a logical unit might instead only employ a subset of the NVM elements for particular memory pages, and thus a single memory page might be shared among logical units. In further examples, the NVM elements might not employ traditional memory page organization, and instead comprise a 'flat' array of column/row addressable elements.

ANN architectures based on processing elements (PE) or multiply-and-accumulate (MAC) units provide highly parallelized convolution computations. PE-based designs along with specialized techniques, such as data reuse, zero gating, and data compression, improves energy efficiency for CNN computations. A memristor array formed from a plurality of memristor-based memory cells has the ability to implement vector matrix multiplication using Ohm's law. The MAC operation ($\Sigma_i x_i \omega_i$) can be mapped to a parallel read operation of a memristor array: $\Sigma_i V_i G_i$, where $V_i$ is the read voltage and $G_i$ is the conductance of the memory cell. Accumulation is performed by accumulating the memory cell current on an associated bitline.

In-memory computing (IMC) operations can be performed using certain emerging NVM technologies, such as memristor technologies. IMC operations proceed by loading synaptic weights into artificial synapses, referred to as nodes, and maintaining these weights in the nodes over many data operations. Data introduced to the nodes is operated on using the weights, and results flow outward from the nodes while the weights remain stationary and ready for further operations with different data. However, the data which is input to each individual node still needs to be fetched from a data buffer or data source. Typically, this input data is fetched from a global buffer which is shared among all of the nodes of an ANN. This operation can consume an undesirable amount of energy and lead to bottlenecks on associated data buses.

In image processing applications, specialized neural networks, such as CNNs, can analyze images to detect features that may be recognized within the images. A CNN may operate on pieces of an image as defined by one or more filters or kernels which 'convolve' around the image. As part of the convolution operations, the CNN may perform multiply-and-accumulate (MAC) operations on image data in an area of an image specified by a filter. This filter is applied to various positions over the image. Data can be transferred from memory circuits to a processor in order to perform the aforementioned MAC operations, among other operations. Such data transfers may result in data transfer bottlenecks between the processor and the memory circuits, as well as consume power as signals that carry the data are transferred between the processor and the memory circuits. The examples described herein provide enhanced techniques and circuit architectures for performing ANN operations, such as MAC operations, using non-volatile memory-based neural networks that reduce data traffic and power consumption.

In addition, difficulties in implementing ANNs can arise due to some memristor technologies being capable of having multiple stable conductance states. Binarized neural networks (BNNs) have been recently introduced to reduce computational complexity and relax memory requirements. In BNNs, the synaptic weight and artificial neuron values are truncated into binary values (+1 and −1). Therefore, MAC operations can be reduced to XNOR and bit-count operations. BNNs create an opportunity to further optimize hardware implementations for performance, area and power. BNNs with in-memory computing architectures can be implemented using single-level memory cells, which significantly alleviate the requirements for suitable memory technologies. Some approaches use two memory arrays for positive and negative weights. The accumulated current is sensed and quantized separately in both arrays. A digital output of the negative weight array is then subtracted from a digital output of the positive weight array. These BNNs can be implemented with activations of (+1, 0) and weights of (+1, −1), which loses some states from the intended source algorithm. Advantageously, the examples herein discuss a differential crosspoint memristor array (DCMA) that implements intended source algorithm for BNNs. Moreover, the DCMA does not need to separate the positive and negative weight arrays, which reduces the required area and power.

Turning now to circuit structures that can be used to implement enhanced artificial neural networks, FIG. 1 is presented. FIG. 1 illustrates system 100 with compute system 130 employed as an NVM array-based synaptic weight array, along with peripheral circuitry 110 and 120 to realize one or more layers in a deep neural network. Although system 100 can implement various types of ANNs, the elements of FIG. 1 will be discussed in the context of convolutional neural networks (CNNs) and binarized neural networks (BNNs). Peripheral circuitry can include control circuitry 110 and unified buffer 120, which comprise example circuitry to at least interconnect and control a synaptic weight array for one or more layers in a deep neural network. Host 101 is included in FIG. 1 as an example of an external system or computing processor which can interact with other elements of system 100 to perform ANN operations, receive results from compute system 130, provide instructions to control circuitry 110, and other operations.

Also shown in FIG. 1 are host links 151 and 154, control links 152-153, unified data bus 150, and local links 155-156. Host link 154 is employed to transfer input data for processing by compute system 130 and to receive results from compute system 130. Host link 151 can carry commands or instructions for operating control circuitry 110. Control links 152-153 carry commands and control instructions issued by control circuitry 110, such as for transferring data from unified buffer 120 over unified data bus 150, and controlling neighbor shifting of data among compute units 131-133. Local links 155-156 comprise one or more local data links for transfer of data among compute units 131-133.

Compute system 130 includes three exemplary compute units 131-133 (CU-1, CU-2, and CU-n), but it should be understood that a different quantity can instead be employed. Compute units 131-133 can each comprise a non-volatile memory array, and thus a plurality of non-volatile memory arrays is established by the inclusion of compute units 131-133 within compute system 130. Compute units 131-133 are configured to store one or more synaptic weights in associated non-volatile memory elements, such as $W_1$, $W_2$, and $W_n$ shown in FIG. 1. These synaptic weights or weight values are stored for use in operations of an artificial neural network. The operations can include the MAC operations discussed herein, among other operations. Non-volatile memory arrays are discussed herein to store weight values of weight-stationary data flows and perform in-memory operations. However, it should be understood that other types of elements might instead be employed to implement weight-stationary architectures, or might have arrangements which do not perform in-memory operations. Thus, CUs 131-133 might comprise logic units, MAC units, processing units, or some other form of weight-stationary data flow circuitry.

During operation, input data 160 is presented to compute units 131-133 for propagation, and processing, and presentation as output values (e.g. $output_1$, $output_2$, $output_n$). The propagation and processing operations can be referred to as inference operations, which typically occur after a training process establishes synaptic weights to be stored by artificial synapses of compute units 131-133. For in-memory computation operations, non-volatile memory arrays of compute units 131-133 can perform operations on different portions of input data as defined by corresponding filters represented by the stored weights. In some examples, when one set of operations has completed, a given non-volatile memory array of compute units 131-133 may be provided new data to perform a next operation. The new data, however, may have been previously used as an input to a different non-volatile memory array of compute units 131-133. Rather than retrieving the new data from unified buffer 120, compute units 131-133 can transfer data between different non-volatile memory arrays of compute units 131-133 to save power and reduce data transfer bottlenecks associated with bus 150.

To facilitate the transfer of data between the non-volatile memory arrays of compute units 131-133 within system 100, compute units 131-133 are coupled to individual local links 155-156 that allow for data 'shifting' or transfer between the individual non-volatile memory arrays of compute units 131-133. In one example, compute units 131-133 are configured to receive a portion of the input data from unified buffer 120 over unified data bus 150. Compute units 131-133 are further configured to shift, based at least on control signals issued by control circuitry 110, a portion of the input data to a different non-volatile memory array of a designated compute unit over a local link. This designated compute unit might be a proximate or neighboring compute unit to reduce transfer distances among compute units. However, it should be understood that the data shifting is not limited to neighboring compute units, and might instead occur between more remote compute units. In FIG. 1, a first local link 155 couples CU-1 131 and CU-2 132, and a second local link 156 couples CU-2 132 and CU-n 133. In other cases, more than one of the non-volatile memory arrays of compute units 131-133 may be coupled to a shared local bus. Other examples might have subsets of the non-volatile memory arrays of compute units 131-133 coupled to respective local buses or local links.

Turning now to a detailed discussion on the elements of FIG. 1, control circuitry 110 comprises various circuitry and processing elements used for introduction of input data to compute system 130 and interpretation of output data presented by compute system 130. Control circuitry 110 is configured to generate a plurality of control signals that are coupled to both unified buffer 120 and compute units 131-133. In various examples, control circuitry 110 may include any suitable combination of processors and logic circuits, including sequential logic circuits, programmable logic circuits, state machines, and the like. Control circuitry 110 can provide instructions, commands, or data over control links 152-153. Control circuitry 110 can receive resultant data determined by compute system 130 over control link 153 or instruct individual ones among compute units 131-133 to provide the resultant data to unified buffer 120 over unified data bus 150, or to host 101 over various links including link 154. Control circuitry 110 might apply adjustments or signal interpretations to the signaling presented by compute units 131-133 before transfer to host 101. Control circuitry 110 can load synaptic weights into NVM elements of compute units 131-133 prior to introduction of input data to compute units 131-133. In yet further examples, control circuitry 110 can include activation functions, softmax processing elements, logit vector averaging circuitry, noise reduction circuitry, and storage circuitry.

Compute units 131-133 comprise an array of memory devices, specifically non-volatile memory devices. In this example, these NVM devices comprise memristor-class memory devices, such as memristors, ReRAM, MRAM, PCM, or other device technologies. The memory devices may be connected into an array of columns and rows of memory devices accessible using selected word lines and bit lines. However, other memory cell arrangements might be employed and accessed using input control lines and output control lines. Compute units 131-133 are comprised of a plurality of nodes or artificial synapses. Memory cells of compute units 131-133 are arranged in groups commonly referred to as "synapses." As used herein, a synapse is a unit cell of an artificial neural network that is configured to perform a particular operation, such as multiplication of input values based on previously stored weight values. Memory cells in compute units 131-133 store synaptic weights, loaded by control circuitry 110, with values established at least by training operations. Each artificial synapse formed by a memory cell corresponds to at least one NVM element, although in BNN examples each artificial synapse can be formed by at least two NVM elements, as discussed below. Weight values may be stored in the synapses of an artificial neural network after a learning or training phase, where incremental adjustments are made to the overall operation being performed by the artificial neural network.

Each of compute units 131-133 also comprise various circuitry comprising line drivers, lines, switches, sense amplifiers, analog or digital accumulators, analog-to-digital conversion circuitry, digital-to-analog conversion circuitry, or other circuitry used to drive input control lines and monitor/read values presented on output control lines. Circuitry among compute units 131-133 includes electrical connections made among control lines of the associated memory arrays. These control lines are employed by compute units 131-133 to access the individual NVM elements, which might be further organized into memory pages and the like. In specific examples, input control lines might comprise word lines of an NVM array, and output control lines might comprise bit lines of an NVM array. However, the control lines can correspond to other arrangements when different memory technologies are employed or different physical arrangements than row/column configurations. For example, control lines might couple to individual memory cells when non-arrayed configurations of artificial synapses are employed, or when discrete memory cells are employed.

Unified buffer 120 is shared among a plurality of non-volatile memory arrays, such as non-volatile memory arrays included in compute units 131-133. Unified buffer 120 can comprise any non-transitory memory storage circuitry and devices, along with any associated peripheral circuitry, control circuitry, and power circuitry. Unified buffer 120 can comprise static random-access memory (SRAM), dynamic random-access memory (DRAM), volatile or non-volatile memory devices, register files, or any other suitable type of storage circuit. Unified buffer 120 can comprise a single memory device or instead be formed from multiple memory devices.

Figure 2:
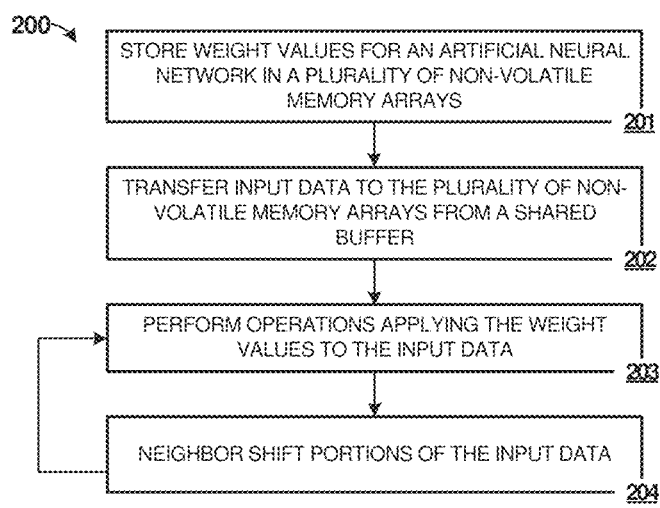
FIG. 2 illustrates operations of an artificial neural network in an implementation.

Turning now to a discussion on the operation of elements of FIG. 1, FIG. 2 is presented. FIG. 2 is flow diagram 200 illustrating a method of operating an artificial neural network. In FIG. 2, operations are related to elements of FIG. 1. However, the operations of FIG. 2 can apply to any of the implementations discussed herein, among others.

In operation, control circuitry 110 stores (201) weight values for an artificial neural network in a plurality of non-volatile memory arrays. In this example, the weight values are represented by $W_1$, $W_2$, and $W_n$. These weight values correspond to synaptic weights used in artificial neural network operations performed in CUs 131-133. Typically, the weight values are stored as data values into non-volatile memory cells of CUs 131-133 which can be formed from one or more non-volatile memory elements, such as memristors or other non-volatile memory technologies. In some examples, the plurality of non-volatile memory arrays of CUs 131-133 comprise at least a portion of a weight-stationary artificial neural network. In weight-stationary artificial neural network arrangements, weight values can remain steady through multiple sets of input data and processing cycles. These weight values might be stored in non-volatile memory cells or arrays, such as discussed herein. However, other arrangements can be employed for weight-stationary data flows. In yet other examples, different weight values are loaded before each processing cycle.

Moreover, the plurality of non-volatile memory arrays of CUs 131-133 are configured to perform in-memory operations by at least applying the weight values on input data provided to the plurality of non-volatile memory arrays. These operations can include multiple-and-accumulate operations (MAC), among others. The multiply portion of the MAC operations comprises multiplying the weight values by associated portions of the input data. When performed in-memory, the multiplication is done in each memory cell by applying a particular portion of the input data over an input line to a non-volatile memory cell, which results in an output on an associated output line that comprises a mathematical multiplication-and-accumulation between the input data and the stored weight value. As will be discussed below, the input line can comprise a word line and the output line can comprise a bit line of a non-volatile memory array that is associated with a particular non-volatile memory cell.

In a first operation or processing cycle of compute system 130, control circuitry 110 initiates transfer (202) of input data 160 to the plurality of non-volatile memory arrays from a shared buffer input data 160 is stored within unified buffer 120 which is shared among CUs 131-133 and can provide input data 160 to CUs 131-133 over unified data bus 150. CUs 131-133 receive this input data 160, or specific portions thereof, for use in ANN operations. CUs 131-133 might each include an input buffer which accepts the particular portion of input data 160 and holds the portion of input data 160 for the operations performed during the first operation or processing cycle.

CUs 131-133 then each perform (203) operations applying the weight values to the input data. Outputs can result from the operations, which are shown in FIG. 1 as $output_1$, $output_2$, and $output_n$. These outputs are the accumulation results on the bit line. The outputs can be transferred over a shared bus, such as bus 150, and associated partial sums may be accumulated before an associated activation module.

Control circuitry 110 then instructs CUs 131-133 to neighbor shift (204) portions of the input data. Selective ones of CUs 131-133 can transfer associated portions of the input data within an input buffer of a corresponding CU to another one of CUs 131-133. This transfer is referred to herein as a 'shift' which allows for local transfer of portions of the input data. Normally, the input data might be transferred back into unified buffer 120 or just discarded if a copy of the input data remains in unified buffer 120. However, this would require another transfer of input data 160 from unified buffer 120 into individual ones of CUs 131-133. Instead, control circuitry 110 can instruct CUs 131-133 to receive respective portions of the input data from either unified buffer 120 or from another one among CUs 131-133. Thus, CUs 131-133 can selectively accept new data from unified buffer 120 or accept shifted data from one the plurality of non-volatile memory arrays of another of CUs 131-133.

In FIG. 1, local data links are provided for transfer of the data between CUs 131-133. Specifically, shifted data 161 and shifted data 162 can be transferred over one or more local links 155-156, which might be discrete links between individual ones of CUs 131-133. Local links 155-156 are not coupled to unified buffer 120 or unified data bus 150. The plurality of non-volatile memory arrays associated with each of CUs 131-133 can thus receive portions of input data 160 from either unified buffer 120 or a neighboring or proximate non-volatile memory array. Typically, local shifting of data will occur between proximate or neighboring CUs. However, in other examples, associated non-volatile memory arrays need not be directly next to each other on an integrated circuit, and instead might be more remote. However, for exemplary purposes, a first non-volatile memory array can shift data to a neighboring or proximate non-volatile memory array.

Once the data shifting has completed, and any new portions of input data has been transferred from unified buffer 120, then compute system 130 performs (203) additional operations or processing cycles by applying the weight values to at least the portions of the input data for each of CUs 131-133. This local shifting process and processing cycle operation can continue until the set of input data has been fully processed by CUs 131-133. The examples discussed below will discuss in more detail the decision-making process behind local data shifting as well as when data should be shifted to a neighbor or retrieved from the unified buffer or shared buffer.

Figure 3:
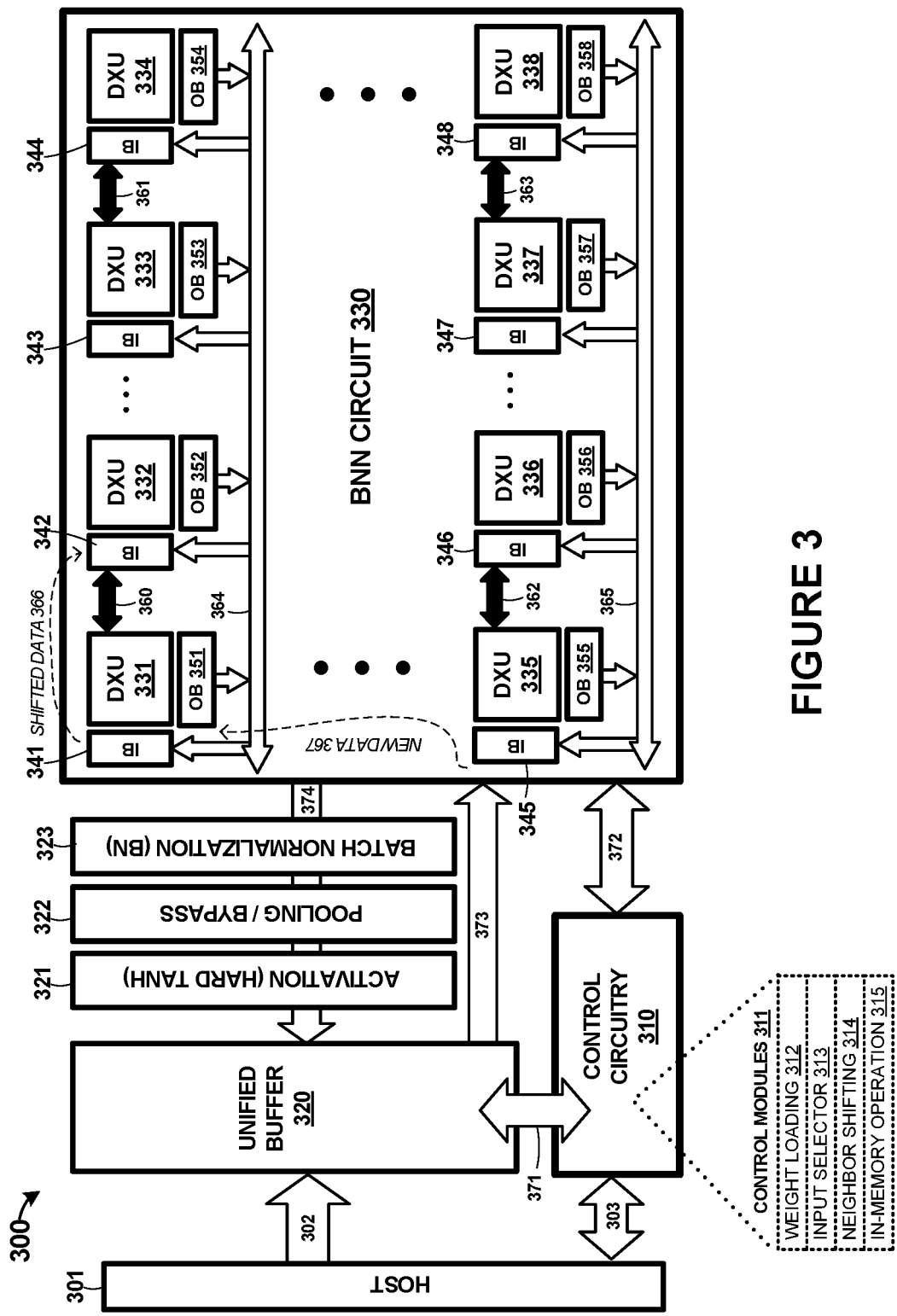
FIG. 3 illustrates an artificial neural network system in an implementation.

Turning now to another implementation of an artificial neural network, FIG. 3 is presented. FIG. 3, example ANN operations using enhanced neighbor shifting techniques are discussed in the context of ANN architecture 300. ANN architecture 300 employs NVM memory elements organized into several individual NVM arrays. These NVM arrays are indicated by the designation 'DXU' in FIG. 3 which refers to differential crosspoint (DX) units (DXUs) which are arrayed to form binarized neural network (BNN) circuit 330. FIG. 3 might include an array of 128×128 DXUs, with each DXU including an NVM array of 64×64 bits, although other configurations are possible. The total quantity of DXUs can be referred to as a convolution core.

ANN architecture 300 includes host 301 which can transfer input data over link 302 into unified buffer 320 for processing by BNN circuit 330. Moreover, host 301 can provide instructions or control information over link 303 to control circuitry 310, which controls operation of BNN circuit 330 and other elements of ANN architecture 300 via control links 371-372. Further control links can be included in FIG. 3, but are omitted for clarity. In addition to host 301, ANN architecture 300 includes control circuitry 310, unified buffer 320, activation function 321, pooling/bypass module 322, batch normalization (RN) module 323, and BNN circuit 330.

Figure 4:
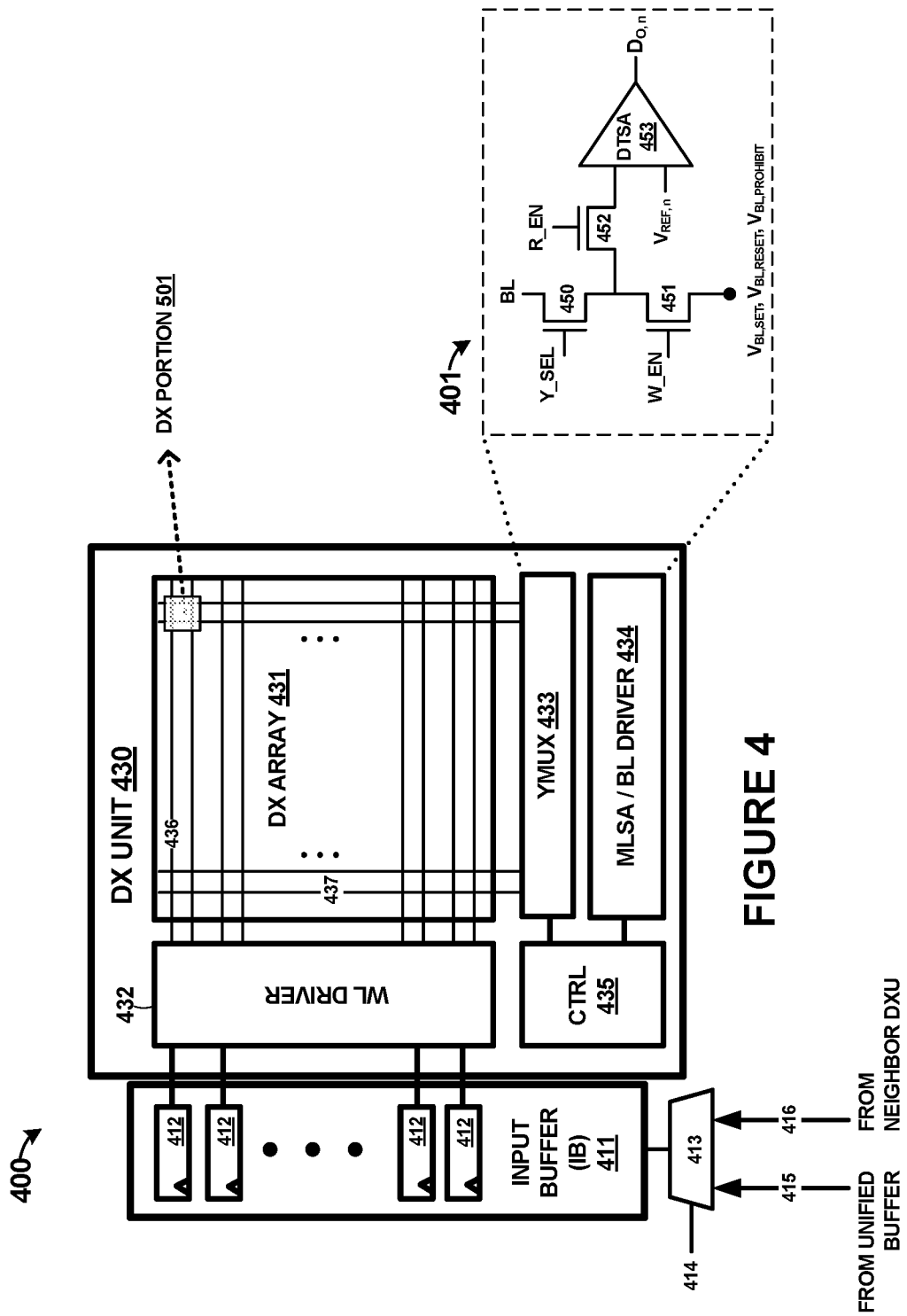
FIG. 4 illustrates artificial neural network elements in an implementation.

Operations are conducted by individual DXUs by calculating a multiplication-and-accumulation of stored weights with input values, where the input values are received either from unified buffer 320 or from a neighboring DXU. The input values are usually represented by voltages fed into word lines of a DXU, and stored weights are represented by conductance states or conductance values in a weight memory array. A weight memory array might comprise an array of NVM devices, such as memristors, coupled via associated word lines and bit lines. Multiplication-and-accumulation results are read out from bit lines in the form of current values. In FIG. 3, each DX unit (DXU) 331-338 includes a 'DX' type of NVM array having two memristors in a differential arrangement per memory cell. This memory cell forms an artificial synapse or artificial neuron. DXU 331-338 also include peripheral circuits, such as drivers, control logic, multiplexers, and sense amplifiers. Specific examples of the composition of DXUs 331-338 are shown in FIG. 4. However, the discussion below for FIG. 3 will focus on top-level operation of BNN circuit 330 in the context of ANN architecture 300.

Each NVM array of DXUs 331-338 comprises a non-volatile memory (NVM) synaptic weight array which employs a row and column arrangements. These rows and columns are accessible over input control lines and output control lines. In this example, the input control lines comprise word lines and the output control lines comprise bit lines. Although other configurations of control lines are possible, for the purposes of this example a word/bit line arrangement will be discussed. Moreover, memory elements of the NVM synaptic weight arrays of DXUs 331-338 are configured to store values corresponding to synaptic weights. These values can be pre-loaded before operations, such as MAC operations, are initiated by a control system. The synaptic weights can be determined during a training process for the associated ANN initiated by a control system, or might established by software models or algorithmic processes. Training operations of a feedforward neural network can include operations of forward propagation, cost computing, backward propagation, parameters update. Synaptic weight refers to a strength or amplitude of connection between two artificial neurons, which are also referred to as nodes. Synaptic weight corresponds to the amount of influence that a biological neuron has on the firing of another.

In FIG. 3, a unified or shared input and output data bus is provided in BNN circuit 330, namely buses 364-365. Buses 364-365 can transfer input data from unified buffer 320 and link 373 for delivery to individual ones of DXUs 331-338. Buses 364-365 can transfer output data from DXUs for delivery to output processing blocks 321-323 and ultimately buffering into unified buffer 320 before transfer to host 301 or other systems. However, the large quantity and frequency of data transfers conducted over buses 364-365 can lead to bottlenecks. Different buses can be provided for each row of DXUs in FIG. 3, or a single unified bus can be included.

In order to partially alleviate these bottlenecks, local links 360-363 are provided. Local links 360-363 comprise data transfer links which couple between neighboring or proximate DXUs. Specifically, each DSU can include an input buffer, as noted by input buffers 341-348. Data can be transferred into input buffers 341-348 over buses 364-365 for caching or storage prior to MAC operations of each DXU. However, data can be shifted among neighboring ones of the DXUs according to the needs of the particular ANN algorithm and processing cycles. Input buffers 341-348 can transfer or shift portions of the data stored therein to neighboring input buffers over local links 360-363. This shifting can occur directly between input buffers of the DXUs. As seen in FIG. 3, new data 367 is provided over buses 364, while shifted data 366 is provided over local link 360. Additional neighbor shifting of data can occur between other ones of the DXUs. Output buffers 351-358 store results from each DXU which arise from associated MAC operations or other ANN operations. Output buffers 351-358 can transfer these results over buses 364-365 to batch normalization module 323 over link 374 for further handling and processing.

Control circuitry 310 manages the data flow among DXUs and other elements of ANN architecture 300. Bus 364 is shared between input buffers (IB) 341-344 and output buffers (OB) 351-354, which are in the same row. Bus 365 is shared between input buffers (IB) 345-348 and output buffers (OB) 355-358, which are in the same row. In one example, control circuitry of individual DXUs are configured to receive command signals generated by control circuitry 310, and issue parallel MAC operations when input data is ready in an associated input buffer circuit. Control circuitry of individual DXUs are also configured to establish communication on local links 360-363 so that data may be sent to and received from other non-volatile memory arrays included in DXUs of BNN circuit 330.

In some examples, control modules 311 are employed as circuitry, programmable logic, logic circuits, software, firmware, or some combination of these. If employed as software or firmware, control circuitry 310 executes the associated program instructions comprising weight loading 312, input selector 313, neighbor shifting 314, and in-memory operation 315. The functionality of control modules 311 can be centralized into control circuitry 310, received in part from host 301 over link 303, or distributed among control circuitry of each DXU.

Weight loading 312 is configured to store or load weight values, also referred to as weights or synaptic weights, into NVM elements of each DXU. Weight values can be determined by a training process, predetermined, or by other processes, and stored into unified buffer 320 or other memory circuitry for later storage into DXUs. Input selector 313 controls input selection circuitry of each DXU or input buffer (IB) in FIG. 3. Input selector 313 can instruct or command when to accept data from unified buffer 320 over bus 364/365 or when to accept data from a neighboring DXU or other source. Neighbor shifting 314 controls transfer of data from one DXU to another, such as a neighboring DXU. This data can be transferred from an associated IB to another IB, or from DXU to DXU, among other options. In-memory operation 315 controls when to begin an ANN operation, such as a processing cycle of BNN circuit 330 using stored weight values and input data.

The outputs of BNN circuit 330 are transferred to batch normalization (BN) module 323, pooling/bypass module 322, and activation layer 321 over link 374. A pooling layer of pooling/bypass module 322 can be implemented with comparators and multiplexors. If no pooling layer is inserted between BNN circuit 330, which performs convolution, and activation module 321, then pooling/bypass module 322 can be bypassed. Activation module 321 comprises an activation layer which performs an activation function in BNN algorithm. In this example, the activation function comprises a "hard tan h" function. Unlike some activation functions, such as sigmoid, which requires large lookup tables or multiplication units, hard tank activation functions can be more readily constructed by comparator circuitry. In this BNN implementation, activation module 321 also binarizes results. The binarized results of activation module 321 is then written to unified buffer 320 and retrieved later for one or more next convolution computations.

FIG. 4 is presented to illustrate an example implementation of a DXU, such as DXUs 331-338 in FIG. 3, along with various peripheral and control circuitry. Specifically, system 400 includes input buffer 411 and DX unit (DXU) 430. Input buffer 411 is coupled to DX unit 430, and includes a plurality of input buffer circuitry 412, such as registers, memory elements, or other circuitry. Input buffer 411 can selectively receive data from either a unified buffer over link 415 or a neighboring DXU over link 416. Link 415 can be coupled to a shared or unified data bus coupled to a shared or unified data buffer, such as unified buffer 320 in FIG. 3. Link 416 can be coupled to a local link or bus, such as links 360-363 in FIG. 3. The selection among links 415-146 can be provided via multiplexer (MUX) 413 controlled by control line 414. Control circuitry 310 in FIG. 3 can provide control to MUX 413 over control line 414.

DX unit 430 includes DX array 431 with peripheral circuits, such as word line (WL) drivers 432, column multiplex circuit (YMUX) 433, multi-level sense amplifier (MLSA)/bit line (BL) drivers 434, and control logic 435. DX portion 501 refers to an exemplary differential crosspoint (DX) cell or artificial synapse, and is shown in further detail in FIG. 5.

In this example, DX array 431 is a 64×64 array of DX cells comprising artificial synapses formed by non-volatile memory cells. This sizing can be other sizes, but in this example 64×64 is selected to reduce resistive-capacitive (RC) parasitic effects and achieve higher speeds than larger sizes. The sizing of DX array 431 can be selected as any other suitable arrangement that satisfies parasitic effect targets and performance goals. Fewer artificial synapses on a same column can also reduce a quantization error for the artificial synapses. With an even smaller array size, a cell efficiency defined by, for example, an array area vs. a total area, drops significantly. Control logic 435 takes commands from control circuitry 310 of FIG. 3 to issue parallel operations when input data is ready. These operations can comprise MAC operations, among others. Control logic 435 also establishes a handshake protocol with a network or data bus of links 415/416 to coordinate input and output data transactions. At the beginning of an operation, the WL drivers 432 activate corresponding differential word lines (defined as differential pairs of WL and WLB lines) according to data stored in input buffer (IB) 411.

Once data has been read out of the artificial synapses of associated DX cells of DX array 431, the data may need to be further processed. According to the BNN algorithm described in FIG. 3, this data can be processed through batch normalization layer 323 which is included after a convolution layer formed by DXUs 331-338 and before a convolution result is truncated into binary numbers. To facilitate such a normalization, a multi-level sense amplifier (MLSA) can be employed. Therefore, for representative DX unit 430 in FIG. 4, instead of a single bit comparator, MLSA 434 is included. MLSA circuitry can vary from that shown in FIG. 4, such as including different analog-to-digital converter (ADC) topologies, having different resolutions, and having various serial/parallel arrangements. However, for the discussion in FIG. 4, detailed view 401 shows one example implementation of MSLA circuitry.

Elements of column multiplexer (YMUX) 433 and MLSA 434 are shown in detailed view 401, MLSA 434 also includes bit line (BL) driver circuitry, MLSA 434 includes circuitry to quantize an analog voltage presented on the associated BL into an accumulation result in 4-bit resolution by at least serially compare a voltage level of the associated BL to one of multiple reference voltage levels. A double-tail sense amplifier (DTSA) 453 topology is applied since DTSA 453 provides offset voltage reduction within a small circuit area. The multiple reference voltage levels can be generated using suitable circuitry capable of generating multiple reference voltage levels, such as to generate sixteen (16) reference voltage ($V_{ref}$) levels. Unlike a flash ADC that senses multiple levels with multiple comparators in parallel, MLSA 434 compares each level serially with one DTSA 453 to reduce the circuit area and fit into a circuit pitch of DX array 431. Thus, different reference voltage levels are given at sequential cycles of MLSA 434. When MAC operations are employed by DX array 431, a MAC latency includes the BL settling time ($T_{SETTLING}$) and sensing time ($T_{SA}$) for 16 levels. The sense time of MLSA 434 and the settling time of the associated BL contribute to the overall latency of a MAC operation. Since the pitch of DX array 431 is relatively small, two columns of DX array 431 can share one set of control transistors (450, 451, and 452) and MESA 434 through the column multiplexer (YMUX 433).

Control transistors 450, 451, and 452 are also shown in detailed view 401. Control transistor 450 is employed as a column multiplexer, such as for YMUX 433, and activated via the Y_SEL. Control transistor 452 controls a read path and is turned on via R_EN when a read process is performed which also involves enabling of control transistor 450 to present a corresponding signal to DTSA 453. Control transistor 451 controls a write path and is turned 'on' via W_EN when a write process is performed.

Figure 5:
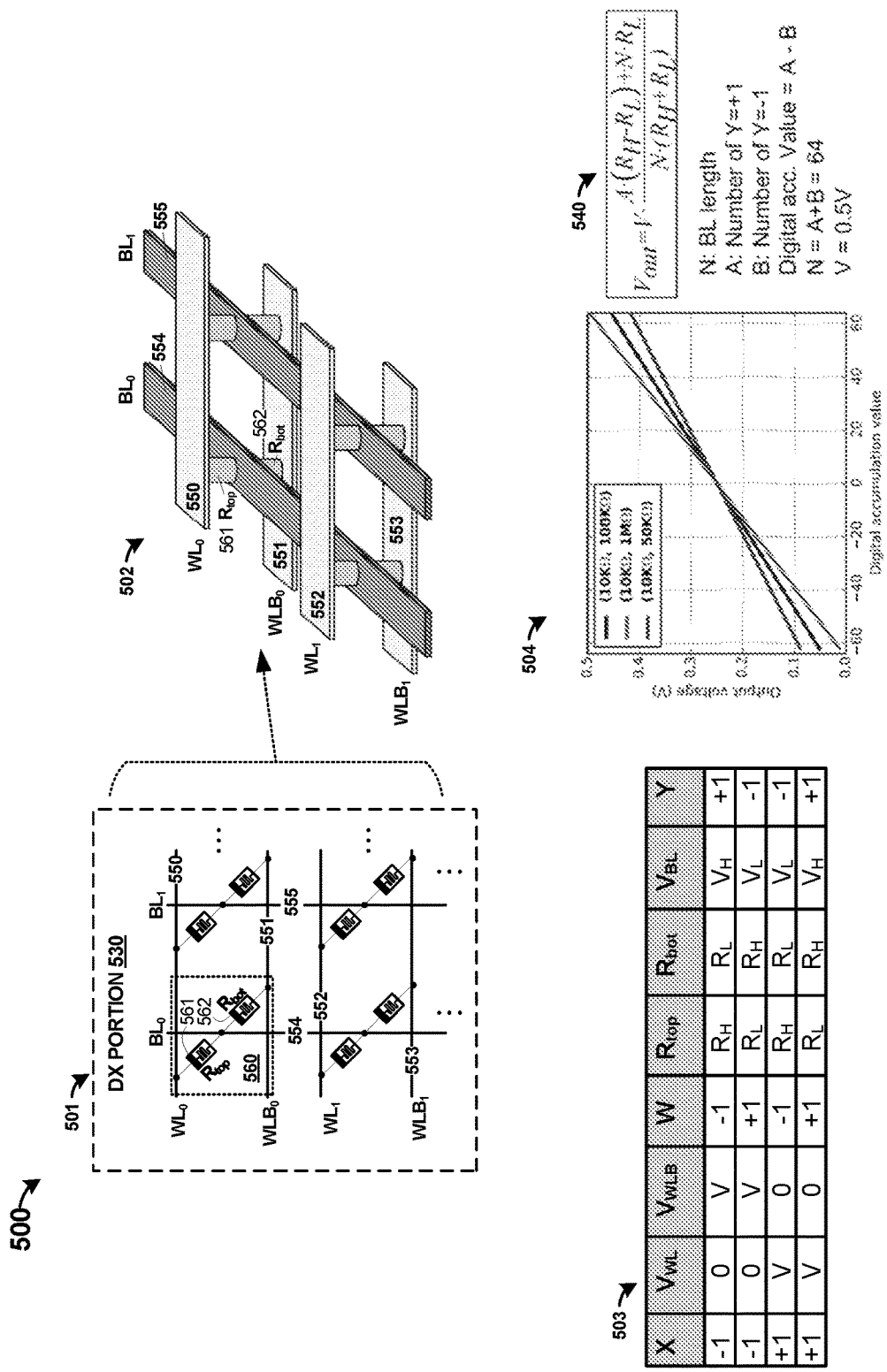
FIG. 5 illustrates artificial neural network elements in an implementation.

FIG. 5 illustrates an example differential crosspoint (DX) configuration 500. A differential crosspoint arrangement is shown in FIG. 5 to provide context for some of the enhanced operations discussed herein. However, it should be understood that different configurations and architectures can be employed other than DX configurations. Specifically, locally-shifted data can be employed between other types of artificial neural network compute units than DX configurations. A suitable compute unit comprises any processing unit that can perform MAC operations.

Configuration 500 includes example circuit portion 501, isometric circuit view 502, table 503, and accumulation output 504. Circuit portion 501 is a schematic view of four (4) DX cells. Isometric circuit view 502 comprises an example physical layout of an integrated circuit formed by DX cells, two sets of bit lines ($BL_0$ 554, $BL_1$ 555), and two sets of differential word lines ($WL_0$ 550/$WLB_0$ 551 and $WL_1$ 552/$WLB_1$ 553).

Each DX cell in FIG. 5 comprises a differential crosspoint memristor arrangement which is employed in the plurality of non-volatile memory arrays shown collectively as the DXUs in FIG. 3, and individually as DX units 430 in FIG. 4. Each DX cell includes a first non-volatile memory cell coupled to a first word line and a bit line, and a second non-volatile memory cell coupled to a second word line and the bit line, Weight values are each encoded by programmed states of the differential crosspoint memristor arrangement formed by the two coupled non-volatile memory cells.

Turning now to an example DX cell 560, two non-volatile memory devices comprising memristor elements are coupled at a shared electrical node. In various examples, the non-volatile memory devices within DX cell 560 may be implemented as memristors or any other suitable type of non-volatile memory cells. A first memristor element 561 is referred to as a 'top' element ($R_{TOP}$) and a second memristor element 562 is referred to as a 'bottom' element ($R_{BOTTOM}$), although other designations can be employed.

$R_{TOP}$ and $R_{BOTTOM}$ together form an artificial synapse of an artificial neural network. $R_{TOP}$ and $R_{BOTTOM}$ are coupled in a differential manner between associated word lines, and thus are referred to as a differential crosspoint (DX) arrangement. $R_{TOP}$ and $R_{BOTTOM}$ are coupled to a shared bit line and each coupled to a respective one of a pair of word lines. $R_{TOP}$ and $R_{BOTTOM}$ are capable of being programmed to a high resistance state (FIRS) or a low resistance state (LRS), which are relative values of resistance and will vary depending upon implementation, feature sizes, and memory technology. Every artificial synapse is thus comprised of one HRS cell and one LRS cell.

As mentioned above, weight values (W) are each encoded by programmed states of the differential crosspoint memristor arrangement formed by $R_{TOP}$ and $R_{BOTTOM}$. Every artificial synapse in a DX array contains two memristors (e.g. an associated $R_{TOP}$ and $R_{BOTTOM}$) with opposite states. In the differential arrangement, the weight values are represented by a combination of the HRS and LRS for a given artificial synapse. During operation, a binary input value (X) is presented as a differential value across a particular pair of word lines associated with an artificial synapse, such as $WL_0$ and $WLB_0$. $R_{TOP}$ and $R_{BOTTOM}$ form a voltage divider along a particular bit line and a voltage level of the bit line (BL) corresponds to an output (Y) of the voltage divider formed by $R_{TOP}$ and $R_{BOTTOM}$.

An artificial neural network having convolution acceleration features, such as those described herein, can perform MAC operations on a portion of input data. In the architecture described herein, binary input values corresponding to a portion of the input data are applied across an artificial synapse. The artificial synapse then multiplies the binary value based on a previously stored weight value. A list of cases depicting the multiplication of two binary numbers (+1 and −1) within an artificial synapse is depicted in table 503.

In one example, a WL driver circuit is configured, in response to initiation of a MAC operation, to enable particular word lines based on values of the input data stored in the associated input buffer. Table 503 lists four example cases of multiplying two binary numbers (+1 and −1), where X is the input, W is the weight, and Y is the output. To represent an input of '−1', an associated WL is coupled to a reference potential (e.g. electrical ground) and an associated WLB is coupled to a designated voltage, $V_{READ}$, which might be a designated voltage level which prevents read disturb. The configuration is reversed while representing input of '+1' (i.e. WL is coupled to V and WLB is coupled to ground). For different weight values, the top memristor ($R_{TOP}$) is programmed to HRS ($R_H$) when W is −1, and programmed to LRS ($R_L$) when W is +1. The bottom memristor ($R_{BOTTOM}$) is programmed in an opposite fashion. As a result, the output voltage on the BL matches the truth table in FIG. 5. Specifically, $V_H = V(R_H/(R_H+R_L))$ corresponds to Y=+1, and $V_L = V(R_H/(R_H+R_L))$ corresponds to Y=−1.

To implement an accumulation output on a particular BL, all the rows associated with that BL are activated simultaneously. Unlike other approaches that sense a current accumulated on a BL, the DX scheme discussed herein forms a voltage dividing network on each BL. The accumulation output of a BL is established as a voltage mapped to the digital summation linearly for the voltage dividing network. Accumulation output 504 shows equation 540 to derive the output voltage representing the accumulation output and a correlation between the digital summation value and the output voltage. Advantageously, the output voltage is determined by the resistance ratio of the DX cell (HRS/LRS), and not the absolute value of the resistance. Large margin is maintained with resistance ratio ranging from 5 to 100, and a BL voltage is then sensed by a multi-level sense amplifier (MLSA), such as MLSA 434 in FIG. 4, that can quantize the analog BL voltage into 4-bit digital value.

It should be noted that to reduce the effect of limited endurance in a particular DX cell, the DX cells in a DX array can programmed with pre-trained weight values. Then, the DX array need only perform inference computations instead of both training and inference operations. To program weight values into a DX cell, the following process can occur. For example, to program $R_{TOP}$ to LRS (e.g. a 'set' operation) and $R_{BOTTOM}$ to HRS (e.g. a 'reset' operation), a corresponding WL/WLB are connected to $V_{WRITE}$ indicating a differential representation of the weight value, and the corresponding BL is tied to ground so that a positive voltage is dropped on $R_{TOP}$ and a negative voltage is dropped on $R_{BOTTOM}$. To program $R_{TOP}$ to HRS and $R_{BOTTOM}$ to LRS, the corresponding WL/WLB are tied to ground and the corresponding BL is set to $V_{WRITE}$.

Figure 6:
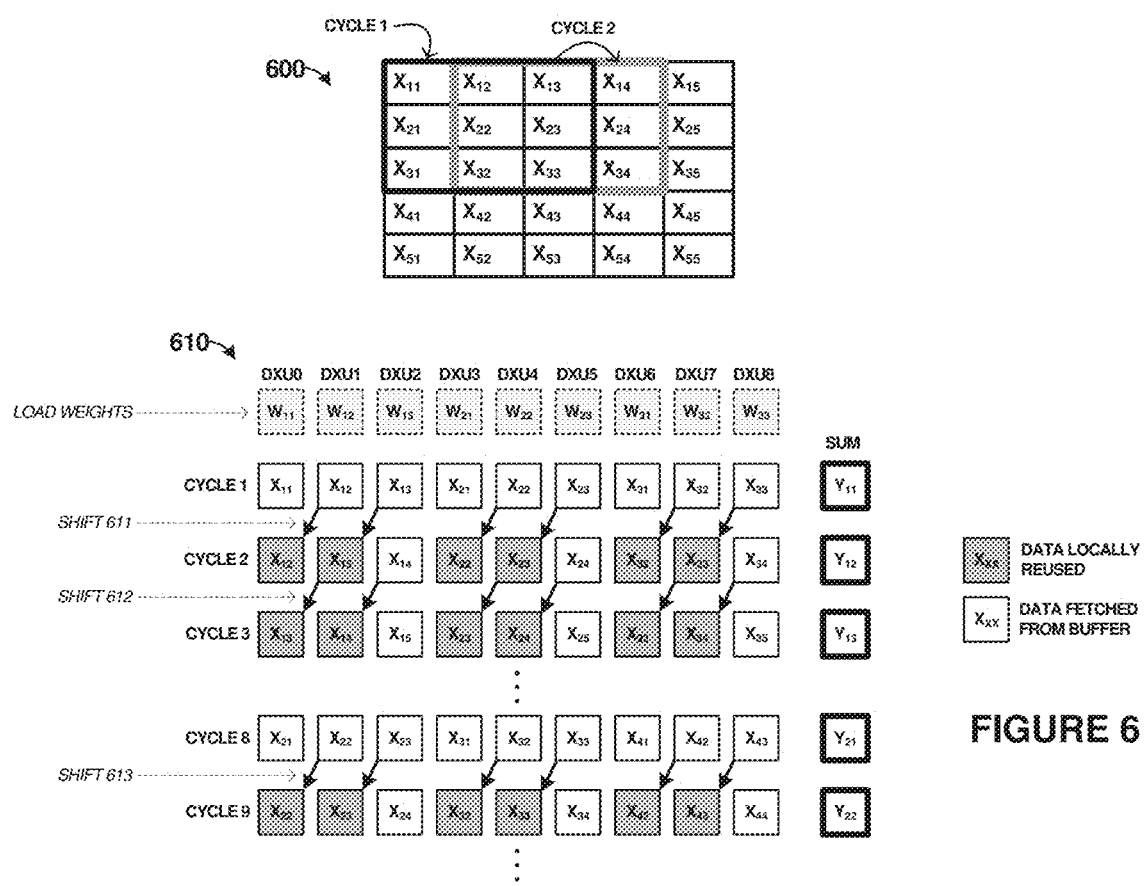
FIG. 6 illustrates operations of an artificial neural network in an implementation.

Turning now to a detailed discussion on the data shifting operations of an ANN, FIG. 6 is presented. FIG. 6 includes example data set 600 and shifting process 610. Data set 600 includes several rows and columns of data, which might comprise pixel data from a portion of an image, among other data types. In FIG. 6, input data (X) is indicated by subscripts which refer to the row and column of the data, namely a first digit of the subscript indicates a row and a second digit of the subscript indicates a column. FIG. 6 shows a neighbor shifting scheme of a 3×3 filter running through a 9×9 input feature map. Any number of rows and columns can be included in the input data, but only 5 rows and 5 columns are included in data set 600 for clarity.

Two cycles of filter operations are indicated for data set 600, a first cycle (cycle 1) and a second cycle (cycle 2). The operations can comprise MAC operations, as discussed herein, but may instead comprise other suitable ANN operations. During each cycle, a 3×3 set of data is processed by a particular DX unit using weight values ($W_{11}$-$W_{33}$) previously stored in NVM elements of the DX unit. As can be seen for cycle 1 in data set 600 and shifting process 610, a first 3×3 set of data is presented as input data to nine DX units (DXU0-DXU9) having associated weight values ($W_{11}$-$W_{33}$). This set of data for cycle 1 comprises data portions $X_{11}$, $X_{12}$, $X_{13}$, $X_{21}$, $X_{22}$, $X_{23}$, $X_{31}$, $X_{32}$, and $X_{33}$, indicated by the black shaded box in data set 600. Once cycle 1 completes, a result ($Y_{11}$) is determined, which might comprise a MAC result after multiply and accumulation operations are performed by the corresponding DXUs.

In cycle 2, another 3×3 input data portion is selected for processing in data set 600. However, only a subset of the 3×3 input data portion corresponds to 'new' data from data set 600, namely data portions $X_{14}$, $X_{24}$, and $X_{34}$. Portions $X_{12}$, $X_{13}$, $X_{22}$, $X_{23}$, $X_{32}$, and $X_{33}$ are to the same as that of cycle 1. Thus, in shifting process 610, various ones of the DXUs can shift or transfer the data portions over one or more local links to other DXUs, which might be neighboring DXUs. Shift 611 occurs, where $X_{12}$ is shifted from DXU1 to DXU0, $X_{13}$ is shifted from DXU2 to DXU1, $X_{22}$ is shifted from DXU4 to DXU3, $X_{23}$ 1s shifted from DXU5 to DXU4, $X_{32}$ is shifted from DXU7 to DXU6, and $X_{33}$ is shifted from DXU8 to DXU7. DXU2, DXU 5, and DXU 8 all receive new data from a shared or unified buffer instead of from another DXU, specifically, data portions $X_{14}$, $X_{24}$, and $X_{34}$.

After another cycle of processing by the DXUs, sum $Y_{12}$ is produced, and another shift 612 is performed as indicated in FIG. 6. As the 3×3 window of data moves through the entire data set 600, various subsets of the data will be shifted among DXUs while other subsets will be introduced to associated DXUs as new data from a shared buffer. Cycles 3-9 can continue this process of MAC operations and selective data shifting. Shift 613 indicates another shift process for this particular data set 600. Larger or smaller data sets may have a different quantity of cycles.

Thus, when the filter shifts to the right in data set 600 by one pixel, six out of nine of the data portions have already been loaded into DXUs from a previous cycle. When the filter is shifted right, two-thirds of the input data from neighboring DXUs can be reused. Data movement from a shared or unified buffer contributes to a large portion of power consumption in deep neural network computations. The DXU-based BNN convolution accelerator described herein has three data reuse schemes to reduce the total number of memory accesses. First, the weight stationary scheme eliminates the need of fetching weight from an external memory for each cycle. Second, the input data is shared for different filters simultaneously. Third, since the data flow of BNN is deterministic, a pattern of data shifting among neighbor DXUs can be employed. While the weights are stored in DXUs, the input is typically fetched from a unified buffer. When the filter is shifted right, a subset of the input data can be transferred to neighboring DXUs that can save ⅔ of the fetches from a unified buffer. Local links connecting neighboring DXUs are established to save the bandwidth of a shared bus of the unified buffer and reduce routing complexity. Moreover, the neighbor shifting scheme can reduce ⅔ of the input data traffic. Since the DXUs are implemented with non-volatile memories, power can be turned off when a DXU is not activated to save power. The DXUs discussed herein typically have a peak power efficiency of 160 TMAC/s/W and is suitable for edge devices in artificial neural network systems.

Some artificial neural networks allow for multiple convolutions, each associated with its own convolution layer, to be sequentially performed, with the output of one convolution layer being passed onto another convolution or other layer for further processing. Each convolution layer may have its own set of filters to define portions of its respective input data on which to operate. Different non-volatile memory arrays may be assigned to different convolution layers. Register circuits included in the artificial neural network may be configured to store information indicative of which convolution layer the corresponding non-volatile memory array is associated. Additionally, or alternatively, information indicative of a total number of non-volatile memory arrays associated with a particular convolution layer and partition information for the non-volatile memory array may he stored in the register circuits.

Figure 7:
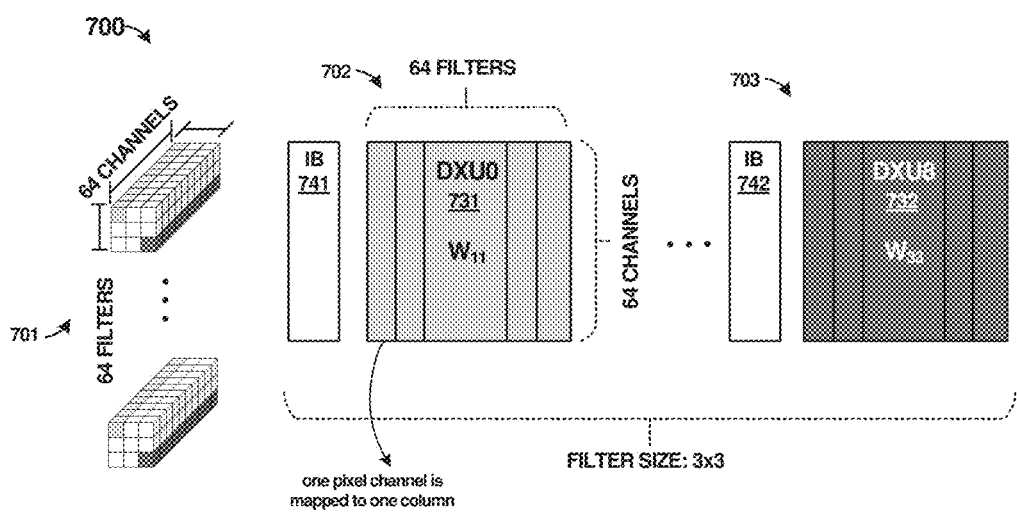
FIG. 7 illustrates operations of an artificial neural network in an implementation.

FIG. 7 is now included illustrating an embodiment in which a convolution layer is mapped to multiple non-volatile memory arrays. In FIG. 7, an example convolution layer of sixty-four (64) 3×3×64 filters 701 mapped to nine (9) non-volatile memory arrays (DXUs) is presented. One pixel-channel in filter 701 is mapped to one column in 702-703. Image input data may he shared between different filters on the same row, thereby allowing calculations for the different filters to be done in parallel. The data sharing may occur via input buffers (741-742) or other portions of the associated DXUs (e.g. DXU0/DUX8). A single pixel-channel may be mapped to a particular column within a non-volatile memory array in order to perform accumulation. A partial summation might be stored in an output buffer of a DXU before transfer over a data bus. All of the partial summations from various DXUs may be accumulated and then added to generate a total sum prior to performing a batch normalization operation.

The DXU configuration with neighbor shifting of data described herein can advantageously be used for any algorithm/model that employs binarized MAC operations. However, the data flow between DXUs and the controller might be different in other example algorithms than what is shown herein for MAC operations. Moreover, BNN models with different filter sizes can all be partitioned and mapped to DXUs. For example, a convolution layer with 128 5×5×256 filter can be partitioned to 200 DXUs. A complex model like a Visual Geometry Group model (e.g. VGG-16) can employ 33,800 DXUs in total. Therefore, implementing VGG-16 needs at least 184×184 DXUs. When a large DXU array is used to implement a model smaller than the array size, the spare DXUs can be repurposed to be normal memory arrays, among other functions. Also, a DXU can be powered off due to its nonvolatility. Therefore, such a DXU array is power efficient even when portions of the DXU array are under-utilized. In order to coordinate data traffic for different models, every DXU can hold a set of registers for an identifier indicating which convolution layer the DXU belongs to, a total number of DXUs for this layer, and a partition information of the DXU. For example, a 5th layer in VGG-16 can use 72 DXUs. The 17th DXU implementing the 5th layer in VGG-16 might have an ID number of 5-72-17. The registers can be configured by a host or control circuitry when initializing or mapping the model to the DXU array.

Figure 8:
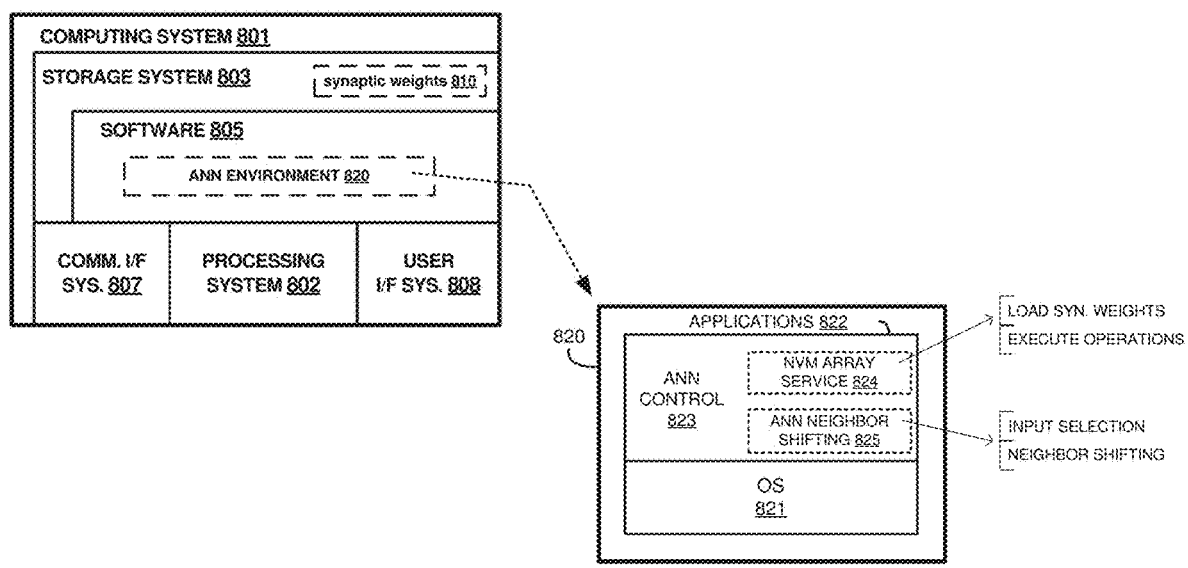
FIG. 8 illustrates a computing system to host or control an artificial neural network according to an implementation.

FIG. 8 illustrates computing system 801 that is representative of any system or collection of systems in which the various operational architectures, scenarios, and processes disclosed herein may be implemented. For example, computing system 801 can be used to implement host 101, control circuitry 110, or portions of unified buffer 120 of FIG. 1, host 301, control circuitry 310, or portions of unified buffer 320 of FIG. 3, control logic 435 of FIG. 4, or any other instance of control circuitry or data shifting functions discussed herein. Moreover, computing system 801 can be used to store and load synaptic weights into NVM arrays, configure interconnect circuitry to establish one or more layers of artificial neural networks, and determine synaptic weights through training operations. Computing system 801 can implement many of the control operations discussed herein, whether implemented using hardware or software components, or any combination thereof.

Examples of computing system 801 include, but are not limited to, computers, smartphones, tablet computing devices, laptops, desktop computers, hybrid computers, rack servers, web servers, cloud computing platforms, cloud computing systems, distributed computing systems, software-defined networking systems, and data center equipment, as well as any other type of physical or virtual machine, and other computing systems and devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 808. Processing system 802 is operatively coupled with storage system 803, communication interface system 807, and user interface system 808.

Processing system 802 loads and executes software 805 from storage system 803. Software 805 includes artificial neural network (ANN) environment 820, which is representative of the processes discussed with respect to the preceding Figures. When executed by processing system 802 to implement and enhance ANN operations, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a microprocessor and processing circuitry that retrieves and executes software 805 from storage system 803. Processing system 802 may be implemented within a single processing device, but may also be distributed across multiple processing devices, sub-systems, or specialized circuitry, that cooperate in executing program instructions and in performing the operations discussed herein. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805, and capable of optionally storing synaptic weights 810. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, resistive storage devices, magnetic random access memory devices, phase change memory devices, or any other suitable non-transitory storage media.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for enhanced neighbor-shifting of data in ANNs, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include ANN environment 820. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to facilitate enhanced neighbor-shifting of data in ANNs. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

ANN environment 820 includes one or more software elements, such as OS 821 and applications 822. These elements can describe various portions of computing system 801 with which elements of artificial neural networks or external systems can interface or interact. For example, OS 821 can provide a software platform on which application 822 executed and allows for enhanced neighbor-shifting of data in ANNs.

NVM array service 824 can interface with NVM elements to load and store synaptic weights into an NVM array. NVM array service 824 can initiate and control inference operations, MAC operations, or other operations on an NVM-implemented ANN. NVM array service 824 can establish arrangements among NVM elements to implement layers and nodes of an ANN, such as by controlling interconnect circuitry. NVM array service 824 can receive intermediate results from intermediate or hidden layers and provides these intermediate results to subsequent layers. NVM array service 824 can provide final results to of ANN operations for use in image processing, machine learning, or other applications.

ANN neighbor shifting service 825 controls operation of an ANN as described herein. For example, ANN neighbor shifting service 825 can control transfer of input data to a plurality of NVM arrays from a shared buffer, control operations applying weight values to the input data, and control shifting at least portions of the input data from first ones of the plurality of NVM arrays to second ones of the plurality of NVM arrays without transferring the portions of the input data through a shared buffer. Once shifted, ANN neighbor shifting service 825 can control execution of additional operations applying the weight values to at least the shifted portions of the input data as well as newly introduced input data from a shared buffer. ANN neighbor shifting service 825 can control individual compute units of an ANN to selectively accept data from either a shared input buffer or from another compute unit, which might comprise a neighboring compute unit or proximate compute unit.

Communication interface system 807 may include communication connections and devices that allow for communication with other computing systems (not shown) over communication networks (not shown). Communication interface system 807 might also communicate with portions of hardware-implemented ANNs, such as with layers of ANNs, NVM-implemented weight arrays, or other ANN circuitry. Examples of connections and devices that together allow for inter-system communication may include NVM memory interfaces, network interface cards, antennas, power amplifiers, RF circuitry, transceivers, and other communication circuitry. The connections and devices may communicate over communication media to exchange communications or data with other computing systems or networks of systems, such as metal, glass, air, or any other suitable communication media.

Communication interface system 807 can provide for communication between computing system 801 and other computing systems (not shown), which may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof User interface system 808 is optional and may include a keyboard, a mouse, a voice input device, a touch input device for receiving input from a user. Output devices such as a display, speakers, web interfaces, terminal interfaces, and other types of output devices may also be included in user interface system 808. User interface system 808 can provide output and receive input over a data interface or network interface, such as communication interface system 807. User interface system 808 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. An apparatus, comprising:
a plurality of compute units of an artificial neural network, each compute unit configured to store weight values for the artificial neural network in differential crosspoint memristor arrangements formed by a first non-volatile memory cell connected between a first word line and a bit line and a second non-volatile memory cell connected between a second word line and the bit line, the first word line located under the bit line and the second word line located over the bit line, wherein a first of the plurality of compute units is configured to:
receive data from a unified buffer shared among the plurality of compute units; and
shift the data to a second of the plurality of compute units.

2. The apparatus of claim 1, wherein the first of the plurality of compute units is further configured to shift the data without transferring the data through the unified buffer.

3. The apparatus of claim 1, further comprising:
control circuitry configured to instruct the first of the plurality of compute units to:
shift the data to the second of the plurality of compute units, and
selectively accept new data from the unified buffer or accept shifted data from one the plurality of compute units.

4. The apparatus of claim 1, further comprising:
a local data link for transfer of the data between the first of the plurality of compute units and the second of the plurality of compute units, wherein the local data link is not coupled to the unified buffer.

5. The apparatus of claim 1, wherein the plurality of compute units comprise at least a portion of a weight-stationary artificial neural network.

6. The apparatus of claim 1, wherein the plurality of compute units are configured to perform in-memory operations by applying the weight values on input data retrieved selectively from one or more of the unified buffer and portions of the input data shifted locally among the plurality of compute units via data links not coupled to the unified buffer.

7. The apparatus of claim 1, wherein the weight values are encoded by programmed states of non-volatile memory cells of the plurality of compute units.

8. The apparatus of claim 1, wherein the first non-volatile memory cell and the second non-volatile memory cell are memristor class memory devices.

9. A circuit, comprising:
control circuitry configured to generate data control signals;
a plurality of compute units of an artificial neural network;
a unified buffer shared among the plurality of compute units of the artificial neural network; and
a plurality of differential crosspoint memristor arrays in the plurality of compute units, each differential crosspoint memristor array of the plurality of differential crosspoint memristor arrays including a first non-volatile memory cell connected between a first word line and a bit line and a second non-volatile memory cell connected between a second word line and the bit line, the first word line located under the bit line and the second word line located over the bit line, wherein each differential crosspoint memristor array of the plurality of differential crosspoint memristor arrays is configured to:
store weight values for the artificial neural network, and
based on the data control signals, selectively accept first portions of input data from the unified buffer or accept second portions of the input data from ones of the plurality of compute units and perform in-memory computing operations on at least one of the first or second portions of input data.

10. The circuit of claim 9, wherein:
at least some of the plurality of compute units are further configured to:
based on the data control signals, transfer the second portions of the input data to proximate ones of the plurality of compute units without transferring the second portions of the input data through the unified buffer.

11. The circuit of claim 10, wherein:
at least some of the plurality of compute units are further configured to:
transfer the second portions of the input data to input buffers local to the proximate ones of the plurality of compute units.

12. The circuit of claim 9, further comprising:
one or more local data links for transfer of the second portions of the input data between at least some of the plurality of compute units and the proximate ones of the plurality of compute units, wherein the one or more local data links are not coupled to the unified buffer.

13. The circuit of claim 9, wherein the plurality of compute units comprise at least a portion of a weight-stationary artificial neural network.

14. The circuit of claim 9, wherein the plurality of compute units are further configured to perform the in-memory computing operations by applying the weight values on the input data to produce results for at least a processing cycle of the artificial neural network.

15. The circuit of claim 9, wherein each differential crosspoint memristor array is formed by at least 64 by 64 differential crosspoint cells.

16. The circuit of claim 9, wherein the weight values are each encoded by programmed states of a differential crosspoint memristor arrangement formed by two coupled non-volatile memory cells.

17. A method of operating an artificial neural network, the method comprising:
storing weight values for the artificial neural network in differential crosspoint memristor arrangements in a plurality of compute units of the artificial neural network, each differential crosspoint memristor arrangement formed by a first non-volatile memory cell connected between a first word line and a bit line and a second non-volatile memory cell connected between a second word line and the bit line, the first word line located under the bit line and the second word line located over the bit line;
transferring input data to the plurality of compute units from a shared buffer;
performing operations applying the weight values to the input data;
shifting at least portions of the input data from first ones of the plurality of compute units to second ones of the plurality of compute units without transferring the portions of the input data through the shared buffer; and
performing additional operations, the additional operations comprising applying the weight values to at least shifted portions of the input data.

18. The method of claim 17, further comprising:
shifting at least the portions of the input data over one or more local data links for transfer of the portions of the input data between corresponding ones of the plurality of compute units, wherein the one or more local data links are not coupled to the shared buffer.

19. The method of claim 17, further comprising:
in each of the plurality of compute units, selectively accepting the input data from the shared buffer or accepting shifted data comprising the portions of the input data from at least one the plurality of compute units.

20. The method of claim 17, wherein the differential crosspoint memristor arrangements are configured to perform in-memory operations by applying the weight values on the input data to produce results for at least a processing cycle of the artificial neural network; and wherein the weight values are each encoded by programmed states of non-volatile memory cells of the differential crosspoint memristor arrangements.

* * * * *